Sept. 19, 1933.　　　A. C. DOBRICK　　　1,927,451

COMPRESSION COUPLING

Filed July 26, 1929

Inventor:
August C. Dobrick
By John Howard McElroy
his Atty.

Patented Sept. 19, 1933

1,927,451

UNITED STATES PATENT OFFICE 1,927,451

COMPRESSION COUPLING

August C. Dobrick, Chicago, Ill., assignor to The Imperial Brass Manufacturing Company, Chicago, Ill., a corporation of Illinois Application July 26, 1929. Serial No. 381,161

2 Claims. (Cl. 285—166)

My invention is concerned with compression couplings of the type in which an interiorly-threaded female member has an annular distorting shoulder beyond the thread, against which shoulder the tapered end of the exteriorly-threaded male member is forced as it is screwed in place, to compress, as it were, said tapered end into, or into engagement with, the pipe passing through the male member and into the female member to which it is coupled.

I have found that the final turning of the tapered end on the tube tends to crystallize or otherwise affect the tube so that it breaks off in use within said tapered end much sooner than it should, and I remedy this difficulty in my improved coupling by forming the tapered end of the male member as a separate sleeve held in place and guided in the assembly of the parts by an annular flange projecting away from the tapered end of the sleeve, which flange fits snugly in an annular recess formed in the adjacent end of the male member. When the male member is screwed in and the disconnected tapered end carried and guided thereby begins to be compressed into the tube by its contact with the distorting shoulder, the resistance offered to the continued rotation of the tapered end causes it to cease to turn with the male member, but it continues to be forced inwardly against the tube by a direct longitudinal thrust produced by the continued rotation of the male member.

Tests have demonstrated that a tube thus coupled is more durable than the old style, presumably due to there being less crystallization of the material of the tube than occurred with the old form. Moreover, it produces a joint that can be very readily removed, if desired, since the threaded portion of the male member is not in any way jammed on the tube, although the detached tapered sleeve is permanently secured thereon, but this does not prevent the tube being easily withdrawn from the coupling when the male member is screwed out; and reinserted, if necessary or advisable.

To illustrate my invention, I annex hereto a sheet of drawing, in which the same reference characters designate identical parts in all the figures, of which,—

Figure 2:
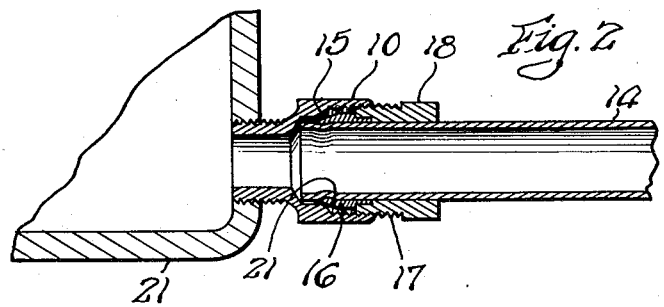
Fig. 2 is a similar view, showing my coupling used to connect a pipe to a reservoir.
Figure 1:
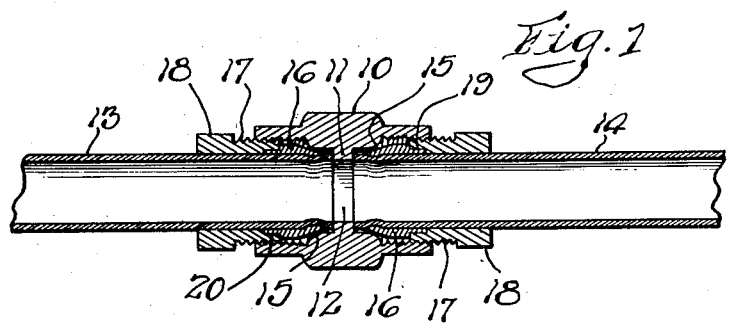
Fig. 1 is a central longitudinal section showing my coupling in use to connect two pipes end to end.
Figure 3:
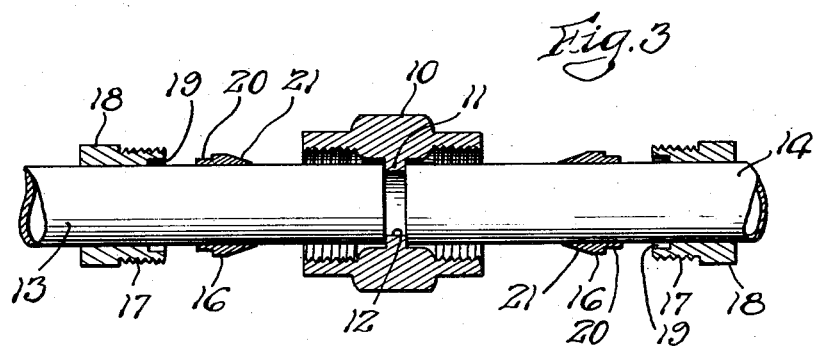
Fig. 3 is a view similar to Fig. 1, but showing the parts threaded on the pipes before they are finally assembled.

Where the female member is designed to couple two pipes end to end, as seen in Fig. 1, it consists of the cylindrical body portion 10, preferably having a flange 11 at its center, hexagonal in cross section, so that a wrench can be applied thereto. The bore therethrough at the center has what may be called an annular flange 12 projecting thereinto and forming the stops for the ends of the tubes 13 and 14 to be connected, these tubes abutting against the shoulders formed by the flange, and the diameter of the aperture 12 being preferably not less than the internal diameter of the tubes. On either side are the annular distorting shoulders 15, which are of the proper design so that when the tapered end of the sleeve 16 is forced against such shoulder as the male member is screwed in place, the metal will be slightly distorted and forced inward so as to engage and slightly compress the soft metal of the tube, as indicated in Figs. 1 and 2. From the shoulders 15 outwardly to the ends, the female member is internally threaded to co-operate with the external threads 17 of the male member, which preferably has the hexagonal flange 18 on its end, to which a wrench may be applied. At its inner end I cut out a recess 19, preferably rectangular in cross section and preferably interiorly located, and which has the same dimensions as the correspondingly shaped flange 20 formed on the adjacent end of the sleeve 16, which fits snugly therein, so that prior to the assembly of the parts, the sleeve 16 may be conveniently held in the male member, from which it is not apt to be accidentally detached. The inner end of the sleeve 16 is tapered, as shown at 21, and when the parts are assembled, and the male member is screwed in place, the sleeve 16 will cease to rotate with the male member, if it has been rotating therewith, as soon as the tapered surface 21 engages the distorting shoulder 15, so that the further screwing in of the male member simply results in the sleeve being forced inwardly by a direct thrust without further rotation, so that the sleeve 16 is connected to the pipe, which it slightly distorts, by this non-rotating thrust, which does not tend to crystallize the metal of the tube, as does the continued rotation resulting where the tapered end is a part of the male member.

Figure 4:
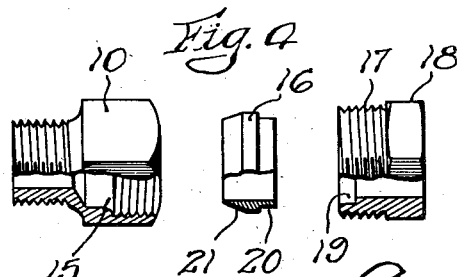
Fig. 4 is a view of the connection shown in Fig. 2, with the parts detached and partly in central vertical section.

With the very acute end shown co-operating with the convex distorting shoulder, said end tends to curve outwardly, and is not forced inwardly into the body of the tube so as to weaken it.

Where my invention is applied to connect a pipe 14 to the tank 21, as seen in Figs. 1 and 4, the female member is modified, as shown, having the reduced end threaded as seen, so that it may be screwed into a threaded aperture in the tank.

What I claim as new, and desire to secure by Letters Patent of the United States, is:

1. As a new and useful article of manufacture, an externally-threaded male member adapted to be screwed into a female member having an internal set of threads and an internal annular distorting shoulder, and having an annular recess in its inner end, and a tapered sleeve having at its outer end an annular flange adapted to enter and fill the annular recess and be positioned thereby for shipment and assembly, and so that the tapered end can be forced against the distorting shoulder of the female member in a straight-line movement by screwing the male member in place.

2. As a new and useful article of manufacture, an externally-threaded male member adapted to be screwed into a female member having an internal set of threads and an internal annular distorting shoulder, and having an annular right-angled recess on its interior at its inner end, and a tapered sleeve having at its squared outer end an annular flange rectangular in cross section adapted to fit closely in the annular recess of the male member and to be positioned thereby for shipment and assembly, and so that the tapered end of the sleeve can be forced against the distorting shoulder of the female member in a straight-line movement as the male member is screwed in place.

AUGUST C. DOBRICK.